(12) United States Patent
Shin et al.

(10) Patent No.: US 8,464,287 B2
(45) Date of Patent: Jun. 11, 2013

(54) DIGITAL TELEVISION SIGNAL FOR RECEIVING PSIP DATA, METHOD OF PROCESSING DIGITAL TELEVISION SIGNAL, AND DIGITAL TELEVISION RECEIVER

(75) Inventors: Su Hyun Shin, Daegu (KR); Hae Won Jang, Daegu (KR)

(73) Assignee: LG Electronics Inc., Seoul (KR)

( * ) Notice: Subject to any disclaimer, the term of this patent is extended or adjusted under 35 U.S.C. 154(b) by 579 days.

(21) Appl. No.: 12/591,555

(22) Filed: Nov. 23, 2009

(65) Prior Publication Data

US 2010/0077425 A1 Mar. 25, 2010

Related U.S. Application Data

(63) Continuation of application No. 11/376,295, filed on Mar. 16, 2006, now Pat. No. 7,653,922.

(30) Foreign Application Priority Data

Jan. 27, 2006 (KR) .................. 10-2006-0009006

(51) Int. Cl.
*H04N 7/16* (2011.01)
*H04N 7/167* (2011.01)

(52) U.S. Cl.
USPC .............................................. 725/28; 725/25

(58) Field of Classification Search
None
See application file for complete search history.

(56) References Cited

U.S. PATENT DOCUMENTS

| 5,828,402 | A | 10/1998 | Collings | |
| 6,529,526 | B1 * | 3/2003 | Schneidewend | 370/486 |
| 2004/0250272 | A1 * | 12/2004 | Durden et al. | 725/25 |
| 2005/0060740 | A1 * | 3/2005 | Stecyk | 725/28 |
| 2005/0166227 | A1 | 7/2005 | Joshi | |
| 2006/0130118 | A1 * | 6/2006 | Damm | 725/135 |
| 2009/0210893 | A1 * | 8/2009 | Yu | 725/28 |

FOREIGN PATENT DOCUMENTS

| KR | 10-1999-0051888 | 7/1999 |
| KR | 10-1999-0070267 | 9/1999 |
| KR | 10-2000-0014069 | 3/2000 |
| KR | 10-2002-0096103 | 12/2002 |
| KR | 10-2005-0091921 | 9/2005 |

OTHER PUBLICATIONS

Downloadable_US_Region_Rating_System.pdf, "Downloadable U.S. Region Rating System White Paper," Consumer Electronics Association, Dec. 15, 2005, 7 pages.*

(Continued)

*Primary Examiner* — Nasser Goodarzi
*Assistant Examiner* — Mary A Kay
(74) *Attorney, Agent, or Firm* — McKenna Long & Aldridge, LLP

(57) ABSTRACT

A digital television signal for receiving program and system information protocol (PSIP) data, a method for processing the digital television signal, and a digital television receiver are disclosed. The digital television signal used in the digital television receiver in order to receive a program system information protocol (PSIP) data from a broadcast transmitter includes a rating region table containing the PSIP data. Herein, the rating region table includes a global rating value field defining a global rating value which is valid for all graphical rating regions, a rating region field defining a specific graphical rating region to be associated with the rating region table, and at least one local rating value field identifying a local rating value which is valid for the specific graphical rating region only.

6 Claims, 8 Drawing Sheets

OTHER PUBLICATIONS

EIA-766.pdf, Electronic Industries Alliance EIA-766, U.S. Region Rating Table (RRT) and Content Advisory Descriptor for Transport of Content Advisory Information Using ATSC N65 Program and System Information Protocol (PSIP) (Sep. 1998, TK 5102.5, .E44 1998, c.1).*

"The ATSC Transport Layer Including Program and System Information Protocol (PSIP)" (Proceedings of the IEEE, vol. 94, No. 1, Jan. 2006).

"ATSC Program and System Information Protocol for Terrestrial Broadcast and Cable Doc. A/65C" (Jan. 2, 2006, http://www.atsc.org/standards/a_65cr1_with_amend_1.pdf).

EIA-766, U.S. Region Rating Table (RRT) and Content Advisory Descriptor for Transport of Content Advisory Information Using ATSC N65 Program and System Information Protocol (PSIP) (Sep. 1998, TK 5102.5, E.441998, c.1).

Downloadable U.S. Region Rating System White Paper, Consumer Electronics Association, Dec. 15, 2005.

* cited by examiner

FIG. 1

| Syntax | No. of Bits | Format |
|---|---|---|
| rating_region_table_section() { | | |
|     table_id | 8 | 0xCA |
|     section_syntax_indicator | 1 | '1' |
|     private_indicator | 1 | '1' |
|     global_rating_value | 2 | '11' |
|     section_length | 12 | uimsbf |
|     table_id_extension { | | |
|         reserved | 8 | 0xFF |
|         rating_region | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     rating_region_name_length | 8 | uimsbf |
|     rating_region_name_text() | var | |
|     dimensions_defined | 8 | uimsbf |
|     for(i=0; i<dimensions_defined; i++) { | | |
|         dimension_name_length | 8 | uimsbf |
|         dimension_name_text() | var | |
|         reserved | 3 | '111' |
|         graduated_scale | 1 | bslbf |
|         values_defined | 4 | uimsbf |
|         for(j=0; j<values_defined; j++) { | | |
|             abbrev_rating_value_length | 8 | uimsbf |
|             abbrev_rating_value_text() | var | |
|             rating_value_length | 8 | uimsbf |
|             rating_value_text() | var | |
|         } | | |
|     } | | |
|     reserved | 6 | '111111' |
|     descriptors_length | 10 | uimsbf |
|     for(i=0; i<N; i++) { | | |
|         descriptor() | | |
|     } | | |
|     CRC_32 | 32 | rpchof |
| } | | |

FIG. 2

| Syntax | No. of Bits | Format |
|---|---|---|
| rating_region_table_section() { | | |
|   table_id | 8 | 0xCA |
|   section_syntax_indicator | 1 | '1' |
|   private_indicator | 1 | '1' |
|   reserved | 2 | '11' |
|   section_length | 12 | uimsbf |
|   table_id_extension { | | |
|     global_rating_value | 8 | 0xFF |
|     rating_region | 8 | uimsbf |
|   } | | |
|   reserved | 2 | '11' |
|   version_number | 5 | uimsbf |
|   current_next_indicator | 1 | '1' |
|   section_number | 8 | uimsbf |
|   last_section_number | 8 | uimsbf |
|   protocol_version | 8 | uimsbf |
|   rating_region_name_length | 8 | uimsbf |
|   rating_region_name_text() | var | |
|   dimensions_defined | 8 | uimsbf |
|   for(i=0; i<dimensions_defined; i++) { | | |
|     dimension_name_length | 8 | uimsbf |
|     dimension_name_text() | var | |
|     reserved | 3 | '111' |
|     graduated_scale | 1 | bslbf |
|     values_defined | 4 | uimsbf |
|     for(j=0; j<values_defined; j++) { | | |
|       abbrev_rating_value_length | 8 | uimsbf |
|       abbrev_rating_value_text() | var | |
|       rating_value_length | 8 | uimsbf |
|       rating_value_text() | var | |
|     } | | |
|   } | | |
|   reserved | 6 | '111111' |
|   descriptors_length | 10 | uimsbf |
|   for(i=0; i<N; i++) { | | |
|     descriptor() | | |
|   } | | |
|   CRC_32 | 32 | rpchof |
| } | | |

FIG. 3

| Syntax | No. of Bits | Format |
|---|---|---|
| rating_region_table_section() { | | |
|     table_id | 8 | 0xCA |
|     section_syntax_indicator | 1 | '1' |
|     private_indicator | 1 | '1' |
|     reserved | 2 | '11' |
|     section_length | 12 | uimsbf |
|     table_id_extension { | | |
|         reserved | 8 | 0xFF |
|         rating_region | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     rating_region_name_length | 8 | uimsbf |
|     rating_region_name_text() | var | |
|     dimensions_defined | 8 | uimsbf |
|     for(i=0; i<dimensions_defined;i++) { | | |
|         dimension_name_length | 8 | uimsbf |
|         dimension_name_text() | var | |
|         reserved | 3 | '111' |
|         graduated_scale | 1 | bslbf |
|         values_defined | 4 | uimsbf |
|         for(j=0; j<values_defined;j++) { | | |
|             abbrev_rating_value_length | 8 | uimsbf |
|             abbrev_rating_value_text() | var | |
|             rating_value_length | 8 | uimsbf |
|             rating_value_text() | var | |
|         } | | |
|     } | | |
|     reserved | 6 | '111111' |
|     descriptors_length | 10 | uimsbf |
|     for(i=0; i<N;i++) { | | |
|         descriptor() | | |
|     } | | |
|     CRC_32 | 32 | rpchof |
| } | | |

FIG. 4

| global_rating_value | Meaning |
|---|---|
| 0 | Not at all Educational |
| 1 | Slightly Educational |
| 2 | Moderately Educational |
| 3 | Very Educational |

FIG. 5

| global_rating_value | Meaning | global_rating_value | Meaning | global_rating_value | Meaning |
|---|---|---|---|---|---|
| 0x00<br>0x01<br>0x02<br>0x03 | Not at all Educational<br>Slightly Educational<br>Moderately Educational<br>Very Educational | 0x10<br>0x11<br>0x12<br>0x13 | Not at all Humorous<br>Slightly Humorous<br>Moderately Humorous<br>Very Humorous | 0x20<br>0x21<br>0x22<br>0x23 | Not at all Musical<br>Slightly Musical<br>Moderately Musical<br>Very Musical |
| ... | ... | ... | ... | ... | ... |
| 0x30<br>0x31<br>0x32<br>0x33 | Not at all Violent<br>Slightly Violent<br>Moderately Violent<br>Very Violent | 0x40<br>0x41<br>0x42<br>0x43 | Not at all Sexual<br>Slightly Sexual<br>Moderately Sexual<br>Very Sexual | 0x50<br>0x51<br>0x52<br>0x53 | Not at all Abusive<br>Slightly Abusive<br>Moderately Abusive<br>Very Abusive |
| ... | ... | ... | ... | ... | ... |

FIG. 6

```
rating_region_table_section() {
         •
         •
         • rating_region=5
version_number=0
rating_region_name="US(50 states+possessions)"
dimensions_defined=2
            dimensions_name="E/I Ratings"
            graduated_scale=1
            values_defined=5
value       abbrev          rating_value_text
0           " "             " "
1           "E/I"           "E/I all ages"
2           "E/I-3"         "E/I ages 3+"
3           "E/I-7"         "E/I ages 7+"
4           "E/I-10"        "E/I ages 10+"
5           "E/I-13"        "E/I ages 13+"
            dimension_name="TV Smarts"
            graduated_scale=1
            values_defined=3
value       abbrev          rating_value_text
0           " "             " "
1           "Smart-E"       "Elementary"
2           "Smart-M"       "Middle School"
3           "Smart-H"       "High school"
                                •
                                •
                                •
}
```

FIG. 7

| MENU | |
|---|---|
| Select Menu of Global Rating? | No ▼ / Yes |
| Which Rating Criterion will You Select for Blocking Program? | Educational ▼ / Humorous / Musical / Informational / Violent / Sexual / Abusive |
| Select Rating for Blocking | Not at all ▼ / Slightly / Moderately / Very |

DIGITAL TELEVISION SIGNAL FOR RECEIVING PSIP DATA, METHOD OF PROCESSING DIGITAL TELEVISION SIGNAL, AND DIGITAL TELEVISION RECEIVER

This application is a Continuation of application Ser. No. 11/376,295 filed on Mar. 16, 2006 now U.S. Pat. No. 7,653,922, which claims the benefit of Korean Patent Application No. 10-2006-009006 filed in Korea on Jan. 27, 2006, all of which are hereby incorporated by reference.

BACKGROUND OF THE INVENTION

1. Field of the Invention

The present invention relates to a digital television receiver, and more particularly, to a digital television signal for receiving program and system information protocol (PSIP) data, a method for processing the digital television signal, and a digital television receiver. Although the present invention is suitable for a wide scope of applications, it is particularly suitable for providing users with a wider range of broadcast program rating options regardless of the location of the digital television receiver.

2. Discussion of the Related Art

Generally, a digital broadcast system refers to a system that uses a specific compression algorithm, such as a hybrid encoding algorithm, in order to compress and transmit digital video and audio data and that recovers the compressed and transmitted video and audio data back to their initial state, so as to provide diverse information to the viewers. The transmitted data that is included in the digital television signal includes the above-described compression encoded video and audio data. The transmitted data further includes diverse control data for managing and controlling operations of the digital television signal.

More specifically, the digital television signal provided in the digital broadcast system broadly includes two types of data: broadcast program data and program and system information protocol (PSIP) data. For example, the program data refers to a television program which a television network company provides to its subscribed viewers. Such program data includes various types of data including video data, audio data, caption data, and so on. The PSIP data includes modulation type, carrier frequency, packet identification (ID) information for demultiplexing the video and audio data from a packet stream that is transmitted in a carrier signal channel, program guide information (i.e., information including program title, program starting time, brief additional information, etc.), caption service, program rating, present time information, and so on, for each channel in order to normally receive the channel for each broadcast program.

Therefore, when a specific digital broadcast channel is selected, the digital television receiver is tuned to the corresponding broadcast channel. Then, the digital television receiver separates the PSIP data from the packet stream, which is stored in an internal memory. Then, the digital television receiver demultiplexes the video and audio data by using the stored PSIP data. Furthermore, the digital television receiver uses a plurality of information table included in the PSIP data, so as to provide the users with a program guidance service providing brief additional information on the TV broadcast program, presence of a caption service, program rating, and schedule of the corresponding TV broadcast program.

More specifically, according to the digital broadcast system standards, a PSIP data table which is inserted in the digital television signal and transmitted therethrough includes rating region table (RRT) data. Herein, the RRT data includes information corresponding to the region code used in a rating system (RS), region name, number of RS used in the corresponding region, name of each RS, and so on. In other words, the RRT indicates rating information of a broadcast program corresponding to multiple geographical rating regions. For example, in a digital television receiver used in the United States (US), when broadcast programs that can be viewed by viewers over age 14 (i.e., Parental Guidance (PG-13) rated programs) are blocked, the programs corresponding to this rating are not outputted to the screen of the receiver.

However, the related art method of using the RRT data for setting up ratings for digital broadcast programs has the following problems. In the related art method, the program ratings are defined by regions, and the related art RRT only includes a fixed set of data. Therefore, as a wider range of digital broadcast programs are being newly produced, there are limitations in categorizing the programs based only on a fixed set of rating standards. Furthermore, if the contents of the RRT are decided based on the current geographical rating regions in which the digital television receiver is used, the RRT pre-programmed in the memory of the digital television receiver can no longer be used once the receiver is moved to a different region.

SUMMARY OF THE INVENTION

Accordingly, the present invention is directed to a digital television signal for receiving program and system information protocol (PSIP) data, a method for processing the digital television signal, and a digital television receiver that substantially obviate one or more problems due to limitations and disadvantages of the related art.

An object of the present invention is to provide a digital television signal for receiving program and system information protocol (PSIP) data, a method for processing the digital television signal, and a digital television receiver that can diversify the rating standards for digital broadcast programs, so as to provide users (or viewers) with more convenient options.

Another object of the present invention is to provide a digital television signal for receiving program and system information protocol (PSIP) data, a method for processing the digital television signal, and a digital television receiver that can arrange ratings of broadcast programs regardless of the geographical rating region in which the receiver is used, thereby allowing the user to view the programs without having to change the settings each time the digital television receiver is displaced to a different region (i.e., country).

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital television signal for use in a digital television receiver to receive program and system information protocol (PSIP) data from a broadcast transmitter includes a rating region table containing the PSIP data. Herein, the rating region table includes a global rating value field defining a global rating value which is valid for all geographical rating regions, a rating region field defining a specific geographical rating region to be associated with the rating region table, and at least one local rating value field identifying a local rating value which is valid for the specific geographical rating region only.

In another aspect of the present invention, a digital television signal for use in a digital television receiver to receive program and system information protocol (PSIP) data from a broadcast transmitter, includes a rating region table containing the PSIP data, wherein the rating region table includes a table identification (ID) extension field which serves to establish uniqueness of the rating region table, the table ID extension field including a rating region field which defines a global rating value which is valid for all geographical rating regions.

In another aspect of the present invention, a method of processing a digital television signal in a digital television receiver includes receiving a digital television signal including a broadcast program and a rating region table, the rating region table including a global rating value field defining a global rating value which is valid for all geographical rating regions, and blocking display of the broadcast program based upon a comparison between the global rating value and a user-selected criterion.

In a further aspect of the present invention, a digital television receiver includes a tuner arranged to receive a digital television signal, a demodulator arranged to demodulate the digital television signal, a demultiplexer arranged to demultiplex a broadcast program and a rating region table from the digital television signal demodulated from the demodulator, a decoder arranged to parse the rating region table, the parsed rating region table including a global rating value field defining a global rating value which is valid for all geographical rating regions, and a controller arranged to block display of the broadcast program based upon a comparison between the global rating value and a user selected criterion.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 1 illustrates a first example of a bit stream syntax of a rating region table (RRT) according to the present invention;

FIG. 2 illustrates a second example of a bit stream syntax of a rating region table (RRT) according to the present invention;

FIG. 3 illustrates a third example of a bit stream syntax of a rating region table (RRT) according to the present invention;

FIG. 4 illustrates an example of a set of meanings corresponding to "newly_defined_rating" field values;

FIG. 5 illustrates another example of a set of meanings corresponding to "newly_defined_rating" field values;

FIG. 6 illustrates an example of a "newly_defined_rating" field value being redefined according to the present invention;

FIG. 7 illustrates an example of a screen selecting a specific RRT among a plurality of RRT data according to the present invention.

DETAILED DESCRIPTION OF THE INVENTION

Figure 8:
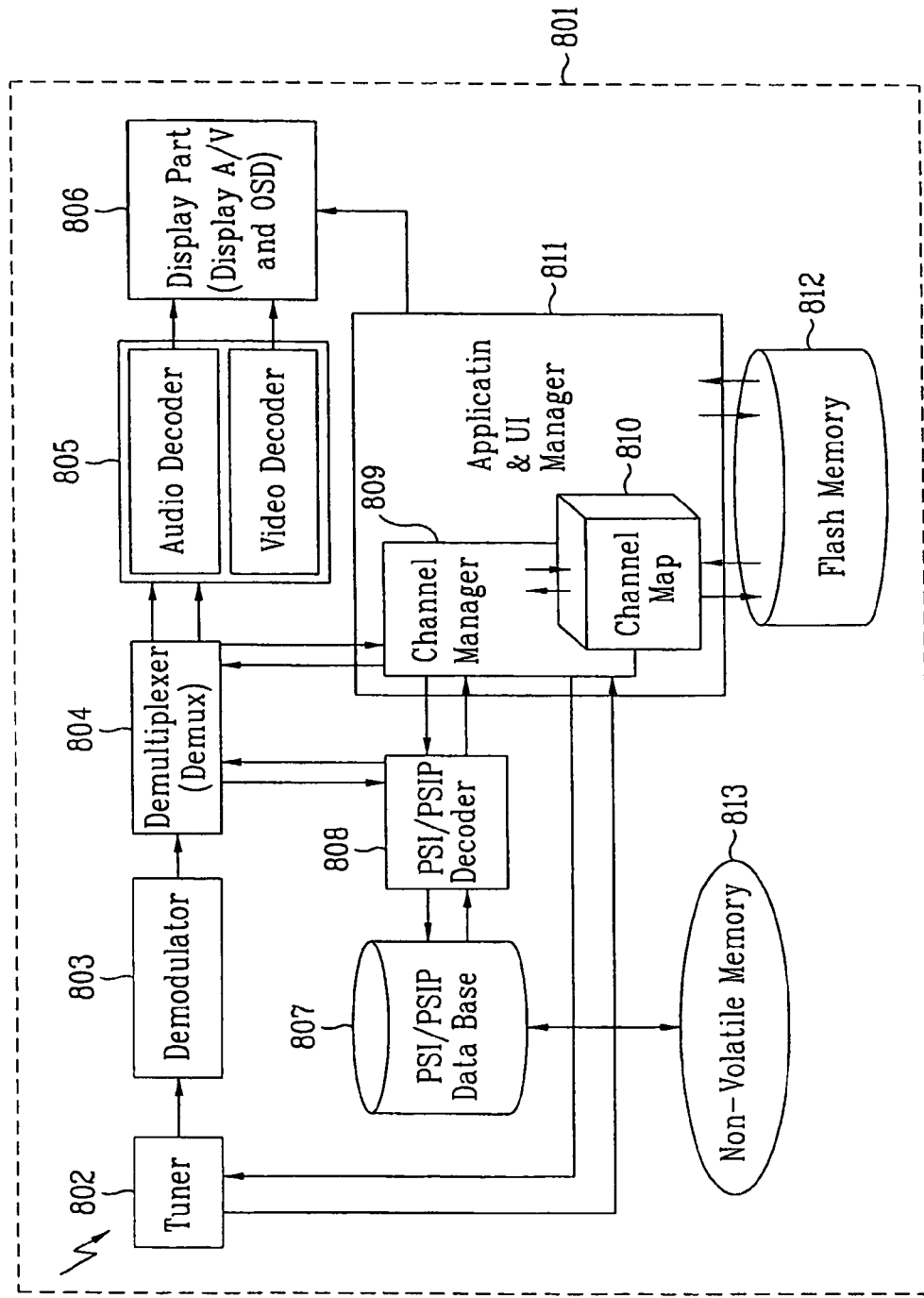
FIG. 8 illustrates a block diagram showing the structure of a digital television receiver according to the present invention.

Reference will now be made in detail to the preferred embodiments of the present invention, examples of which are illustrated in the accompanying drawings. Wherever possible, the same reference numbers will be used throughout the drawings to refer to the same or like parts.

In the present invention, either different broadcast program rating information may be used depending upon region/country (or local/global regions), or the same broadcast program rating information may be used for all regions. Thus, the present invention is advantageous for its compatibility and also for being able to provide a multi-level criterion for the broadcast program rating. For a clearer understanding of the present invention, four different embodiments of the present invention will be described herein in detail. The first embodiment describes a method of defining a new broadcast program rating to an RRT; the second embodiment describes a table showing an example of the new broadcast program rating information; the third embodiment describes a set-up screen for blocking a specific broadcast program based on the new broadcast program rating; and the fourth embodiment describes a digital television receiver receiving the RRT and blocking the specific broadcast program accordingly.

First Embodiment

FIG. 1 illustrates a first example of a bit stream syntax of a rating region table (RRT) according to the present invention. FIG. 2 illustrates a second example of a bit stream syntax of a rating region table (RRT) according to the present invention. And, FIG. 3 illustrates a third example of a bit stream syntax of a rating region table (RRT) according to the present invention. Hereinafter, a method of defining a new broadcast program rating to a rating region table (RRT) will now be described in detail with reference to FIGS. 1, 2, and 3. Furthermore, in order to simplify the description of the first embodiment of the present invention, each field name of the syntax will be marked with quotation marks (e.g., "XXX_YYY_ZZZ").

Referring to FIG. 1, a "global_rating_value" field may be added in a header part of the RRT. Herein, the "global_rating_value" field is defined regardless of the graphicalgeographical rating region information of the digital television receiver. The "global_rating_value" field also indicates the rating information of a broadcast program with more detail and diversity. The field values according to the rating information will be described later on in the second embodiment of the present invention. Herein, the field name "global_rating_value" is only an exemplary name, and all of the fields including the above-mentioned description are within the scope of the present invention.

Other fields configuring the above-mentioned syntax will now be described. A "table_id" is allocated with 8 bits (i.e., an 8-bit field) and may be set to have a 0xCA value, which indicates that the corresponding table is an RRT. A "section_syntax_indicator" is allocated with 1 bit (i.e., a 1-bit field) and its value may be set to '1'. This denotes that the "section_syntax_indicator" section follows a generic section syntax beyond a "section_length" field. A "private_indicator" is allocated with 1 bit (i.e., a 1-bit field) and may be set to '1'. A "section length" is allocated with 12 bits (i.e., a 12-bit field)

and indicates the number of bytes remaining in this section. Herein, the value of the "section_length" field is no larger than 1021.

A "table_id_extension" field is a 16-bit field and is table-dependent. This field may be considered to be logically part of the "table_id" field, which provides the scope for the remaining fields. A "rating_region" field is an 8-bit field and is indicated by an unsigned integer, which defines a rating region that is related with the text in a corresponding "rating_region_table_section( )". A "version number" field is a 5-bit field. This is a version number of an RRT that is differentiated by a combination of the "table_id" field and the "table_id_extension" field. A "current_next_indicator" field is a 1-bit field and is set to '1'. A "section number" field is an 8-bit field and is set to '0x00'. A "last_section_number" field is an 8-bit field and is set to '0x00'. A "protocol_version" field is an 8-bit field and is set to '0x00'.

A "rating_region_name_length" field is allocated with 8 bits and is indicated with an unsigned integer, which defines a total length (bytes) of a "rating_region_name text( )" field that is to follow. The "rating_region_name_text( )" field is a data structure including a multiple string structure which indicates a rating region name that is related with a value given by the "rating_region" field. For example, the above-described rating region name may be 'US (50 states+possessions)'.

A "dimensions_defined" field is an 8-bit field indicating a number of dimensions defined in a corresponding "rating_region_table_section( )" "dimension_name_length" field is indicated with an unsigned integer, which defines a total length (bytes) of a "dimension_name_text( )" field that is to follow. The "dimension_name_text( )" field is a data structure including a multiple string structure which indicates a dimension name described in a corresponding loop.

A "graduated scale" field is a 1-bit field defining whether rating values of a corresponding dimension indicates a graduated scale. A "values_defined" field is a 4-bit field denoting a number of values defined for the corresponding specific dimension. An "abbrev_rating_value_length" field is an 8-bit field and is indicated with an unsigned integer, which defines a total length (bytes) of an "abbrev_rating_value_text( )" field that is to follow. The "abbrev_rating_value_text( )" field is a data structure including a multiple string structure which indicates an abbreviated name for a specific rating value.

A "rating_value_length" field is an 8-bit field and is indicated with an unsigned integer, which defines a total length (bytes) of a "rating_value_text( )" field that is to follow. The "rating_value_text( )" field is a data structure including a multiple string structure which indicates a full name for a specific rating value. A "descriptors_length" field indicates the length (bytes) of all descriptors following the corresponding field. And, 0 or more descriptors may be included in a "descriptor( )" field.

Accordingly, the "global_rating_value" field and the "rating_region" field are included in the rating region table (RRT) according to the present invention, which includes the program and system information protocol (PSIP) data. The "global_rating_value" field is used for indicating broadcast program rating information that is valid in all regions. The "rating_region" field defines the information on a specific region to which the broadcast program rating is applied.

Moreover, depending upon the value of the "rating_region" field, the values of the fields under the "rating_region" field may be varied. The fields under the "rating_region" field may include broadcast program rating information that is valid only in specific regions. Furthermore, each of the fields under the "rating_region" field may be referred to as a 'local rating value' field. Therefore, the 'local rating value' field includes broadcast program rating information that is valid only in specific regions, whereas the broadcast program rating information that is valid in all regions.

The 'local rating value' field consists of at least one field. Herein, the 'local rating value' field may include a 'multiple string structure' indicating 'an abbreviated name of the local rating value' or include a 'multiple string structure' indicating 'a full name of the local rating value'. Alternatively, the 'local rating value' field may also include both a 'multiple string structure' indicating 'an abbreviated name of the local rating value' and a 'multiple string structure' indicating 'a full name of the local rating value'.

Referring to FIG. 2, a "global_rating_value" field may be added in a header part the RRT. Herein, the "global_rating_value" field is defined regardless of the geographical rating region information of the digital television receiver. The "global_rating_value" field also indicates the rating information of a broadcast program with more detail and diversity. The field values according to the rating information will be described later on in the second embodiment of the present invention.

The difference between the "global_rating value" field of FIG. 1 and the "global_rating_value" field of FIG. 2 is that the "table_id_extension" field is included in the "global_rating_value" field defined in FIG. 2. Moreover, the field name "global_rating_value" field is only an exemplary name, and all of the fields including the above-mentioned description are within the scope of the present invention. Further, referring to FIGS. 1 and 2, by positioning the "global_rating_value" field in the header part of the RRT instead of the body part, the decoding rate of the RRT may be enhanced.

Referring to FIG. 3, from the header part of the RRT, an 8-bit "rating_region" field is used to define a new broadcast program rating information to the RRT. In the specification of the present invention including the detailed description and claims, the terms "information" and "code" are used. Herein, the term "information" may be used as a concept (e.g., dimension, level, etc.) including a meaning that corresponds to each field value. The term "code" may be used as a concept referring to the field value itself or to a descriptor of the RRT.

The "rating_region" field is allocated with 8 bits. The "rating_region" field is pre-programmed to indicate 'US (50 states+possessions)' when the field value is '0x01', 'Canada' when the field value is '0x02', 'Taiwan' when the field value is '0x03', and 'Korea' when the field value is '0x04'. The remaining field values starting from '0x05' to '0xFF' are not used. Therefore, part of these field values is defined to be used for a different purpose.

For example, the RRT may be newly defined so that, when the field value of the "rating_region" field is '0x05', the RRT may indicate a broadcast program rating information applicable to (or valid for) all regions regardless of the specific region or country, instead of indicating a broadcast program rating information that is limited to a specific region or country (i.e., US, Canada, Taiwan, and Korea). Herein, the field value '0x05' is only exemplary and may also be selected arbitrarily from '0x06' to '0xFF'. Furthermore, in case the field value of the "rating_region" field is '0x05', the example of the newly defined RRT will be described in the second embodiment of the present invention.

Second Embodiment

FIG. 4 illustrates an example of a set of meanings corresponding to "newly_defined_rating" field values. FIG. 5 illustrates another example of a set of meanings corresponding to "newly_defined_rating" field values. And, FIG. 6 illustrates an example of a "newly_defined_rating" field value being redefined according to the present invention. Hereinafter, detailed rating information of a broadcast program, which is decided in accordance with a field value, will now be described with reference to FIG. 4, FIG. 5, and FIG. 6. More specifically, the description of FIG. 4, FIG. 5, and FIG. 6 will be matched with FIG. 1, FIG. 2, and FIG. 3, respectively.

When using the "global_rating_value" field described in FIG. 1, since the "global_rating_value" field is allocated with 2 bits, a maximum of 4 types of broadcast program rating information may be included in the field. Evidently, a larger number of bits may be allocated to the "global_rating_value" field. However, in this case, already existing regulations must be modified. Furthermore, problems of compatibility with the already existing system may also occur. Therefore, in the present invention, the number of bits allocated to the "global_rating_value" field will be limited to 2 bits.

As shown in FIG. 4, when the value of the "global_rating_value" field is '0', the rating of the broadcast program may be indicated as 'not at all educational'. When the "global_rating_value" field value is ' 1', the broadcast program may be indicated as 'slightly educational'. When the "global_rating_value" field value is '2', the broadcast program may be indicated as 'moderately educational'. When the "global_rating_value" field value is '3', the broadcast program may be indicated as 'very educational'. In the above description, the ratings of the broadcast program are set based on the level of educational content, which is merely an example. The ratings may also be set based on other criteria, such as humorous content, musical content, violent content, sexual content, abusive content, and so on.

When using the "global_rating_value" field described in FIG. 2, since the "global_rating_value" field is allocated with 8 bits, a maximum of 256 types of broadcast program rating information may be included in the field. Evidently, a larger number of bits may be allocated to the "global_rating_value" field. However, in this case, already existing regulations must be modified. Furthermore, problems of compatibility with the already existing system may also occur. Therefore, in the present invention, the number of bits allocated to the "global_rating_value" field will be limited to 8 bits.

As shown in FIG. 5, when the value of the "global_rating_value" field is '0x00', the rating of the broadcast program may be indicated as 'not at all educational'. When the "global_rating_value" field value is '0x01', the broadcast program may be indicated as 'slightly educational'. When the "global_rating_value" field value is '0x02', the broadcast program may be indicated as 'moderately educational'. When the "global_rating_value" field value is '0x03', the broadcast program may be indicated as 'very educational'.

When the value of the "global_rating_value" field is '0x10', the rating of the broadcast program may be indicated as 'not at all humorous'. When the "global_rating_value" field value is '0x11', the broadcast program may be indicated as 'slightly humorous'. When the "global_rating_value" field value is '0x12', the broadcast program may be indicated as 'moderately humorous'. When the "global_rating_value" field value is '0x13', the broadcast program may be indicated as 'very humorous'.

When the value of the "global_rating_value" field is '0x20', the rating of the broadcast program may be indicated as 'not at all musical'. When the "global_rating_value" field value is '0x21', the broadcast program may be indicated as 'slightly musical'. When the "global_rating_value" field value is '0x22', the broadcast program may be indicated as 'moderately musical'. When the "global_rating_value" field value is '0x23', the broadcast program may be indicated as 'very musical'.

When the value of the "global_rating_value" field is '0x30', the rating of the broadcast program may be indicated as 'not at all violent'. When the "global_rating_value" field value is '0x31', the broadcast program may be indicated as 'slightly violent'. When the "global_rating_value" field value is '0x32', the broadcast program may be indicated as 'moderately violent'. When the "global_rating_value" field value is '0x33', the broadcast program may be indicated as 'very violent'.

When the value of the "global_rating_value" field is '0x40', the rating of the broadcast program may be indicated as 'not at all sexual'. When the "global_rating_value" field value is '0x41', the broadcast program may be indicated as 'slight sexual'. When the "global_rating_value" filed value is '0x42', the broadcast program may be indicated as 'moderately sexual'. When the "global_rating_value" field value is '0x43', the broadcast program may be indicated as 'very sexual'.

When the value of the "global_rating_value" field is '0x50', the rating of the broadcast program may be indicated as 'not at all abusive'. When the "global_rating_value" field value is '0x51', the broadcast program may be indicated as 'slightly abusive'. When the "global_rating_value" field value is '0x52', the broadcast program may be indicated as 'moderately abusive'. When the "global_rating_value" field value is '0x53', the broadcast program may be indicated as 'very abusive'.

Evidently, the above-described rating details are only exemplary, and different types of broadcast program rating information may be set in accordance with the requirements of the user. Unlike FIG. 4, a larger number of bits may be used in FIG. 5. Therefore, this example is advantageous in that a wider range of broadcast program rating standards may be arranged. Furthermore, since each standard of the broadcast program rating shown in FIG. 5 is independent from one another, either a broadcast program may be pre-set to be blocked in accordance with all standards, or a broadcast program may be pre-set to be blocked in accordance with only a selection of standards. For example, when the user programs the digital television receiver to block all broadcast programs rated as 'not at all educational', the "global_rating_value" field blocks only the broadcast programs set to have a '0x00' value and does not consider any of the other standards.

However, when the user wishes to set up ratings of a broadcast program in order to block the programs corresponding to all 6 standards shown in FIG. 5, the user must store (or pre-program) all of the field value ranges for each standard in the memory of the digital television receiver. Accordingly, the television receiver refers to the standards stored in the memory so as to verify the rating information of a broadcast program that is being received by the television receiver. If the received broadcast program corresponds to any of the stored standards, the television receiver does not output (or blocks) the corresponding broadcast program. Further, as mentioned above in the description of FIG. 3, when the "rating_region" field is used as diverse broadcast program rating information applicable to (or valid for) all regions, instead of being used as broadcast program rating information for specific region/country only, e.g., when the field value of "rating_region" is '5', as shown in FIG. 6, the RRT may be reconfigured. However, the actual RRT is omitted in FIG. 6.

In addition, when a dynamic RRT according to the present invention is configured in a single table, a "reserved" field may be used, as shown in FIG. 1 or FIG. 2. Alternatively, when a dynamic RRT according to the present invention is configured in two or more tables, the "rating_region" field may be used, as shown in FIG. 3. For example, when the value of the "rating_region" field is '5', as shown in FIG. 6, the "rating_region_name" field may indicate either 'global rating value' or 'dynamic rating'. In other words, a new RRT applicable in (or valid for) all regions can be defined, instead of the original RRT that is applied in specific countries only. The "rating_region_name" field may indicate the United States (US), as shown in FIG. 6. However, such naming is clearly different from that of the related art in that the broadcast program rating according to the present invention is more diversified.

The "dimensions_defined" field may have the value of '2', which indicates that 2 rating dimensions or rating standards are included. In the example shown in FIG. 6, 'E/I Ratings' and 'TV Smarts' are-used as the names for the rating dimension or standard. When the name of the "dimension name" field is 'E/I Ratings', the "values_defined" field is set to a "values_defined" field is '1', this indicates that the broadcast program is rated as an Educational/Informational (E/I) program viewable by viewers of all ages (i.e., E/I all ages). When the value of the "values_defined" field is '2', this indicates that the broadcast program is rated as an Educational/Informational (E/I) program viewable by viewers of age 3 and older (i.e., E/I ages 3+).

When the value of the "values_defined" field is '3', this indicates that the broadcast program is rated as an Educational/Informational (E/I) program viewable by viewers of age 7 and older (i.e., E/I ages 7+). When the value of the "values_defined" field is '4', this indicates that the broadcast program is rated as an Educational/Informational (E/I) program viewable by viewers of age 10 and older (i.e., E/I ages 10+). And, when the value of the "values_defined" field is '5', this indicates that the broadcast program is rated as an Educational/Informational (E/I) program viewable by viewers of age 13 and older (i.e., E/I ages 13+).

On the other hand, when the name of the "dimension name" field is 'TV Smarts', the "values_defined" field is set to a 3-level rating standard. For example, when the value of the "values_defined" field is '1', this indicates that the broadcast program is rated as a program viewable by elementary school students and older (i.e., Elementary). When the value of the "values_defined" field is '2', this indicates that the broadcast program is rated as a program viewable by middle school students and older (i.e., Middle School). And, when the value of the "values_defined" field is '3', this indicates that the broadcast program is rated as a program viewable by high school students and older (i.e., High School).

Third Embodiment

FIG. 7 illustrates an example of a screen selecting a specific RRT among a plurality of RRT data according to the present invention. Hereinafter, a display screen either for setting up broadcast programs to be blocked in accordance with the new broadcast program rating standard or for using the existing global (or country-based) rating of a broadcast program will now be described with reference to FIG. 6.

As described in the first and second embodiments of the present invention, the RRT according to the present invention may be configured either by using the "global_rating_value" field or by using an unused (or reserved) value (e.g., '0x05', etc.) of the "rating_region" field. Herein, the existing global (or country-based) broadcast program rating information (e.g., when the values of the "rating_region" field are '0x01', '0x02', '0x03', and '0x04') may be used, or a new user-selected broadcast program rating standard applicable in all regions may be set up (or programmed).

Therefore, when a menu screen for setting up (or programming) the broadcast programs that are to be blocked is first displayed onto the screen of the receiver, as shown in FIG. 7, another menu screen is displayed in order to verify whether the user will be using the existing broadcast program rating standards designated by each country (i.e., the global standards). At this point, the user may choose to use the broadcast program rating standards designated by each country as they are, or the user may choose to use different rating standards. If the user chooses not to use the already existing rating standards (i.e., if the user selects the menu for programming a new broadcast program rating standard), a menu inquiring which criteria the user will be using to program the new rating standard(s) is displayed on the screen.

More specifically, as described in the second embodiment of the present invention, the new standard may include the levels of educational content, humorous content, musical content, and so on. In other words, the new rating standard may include at least one multi-level criterion. Thereafter, based on the new rating standard, a signal deciding which type of rating is to be selected is inputted. For example, when the displayed menu screen verifies that an arbitrary user chooses not to use the already existing broadcast program rating information designated by each country (i.e., when the user selects a menu for setting (or programming) a new broadcast program rating standard), and when the user selects the educational criterion as the new rating standard, and, more specifically, when the digital television is programmed to output (or display) only the programs that are very educational, other broadcast programs that are rated as 'not at all (educational)', 'slightly (educational)', and 'moderately (educational)' are blocked.

Fourth Embodiment

FIG. 8 illustrates a block diagram showing the structure of a digital television receiver according to the present invention. Hereinafter, a digital television receiver receiving the RRT according to the present invention, thereby blocking specific broadcast programs will now be described in detail. However, the fourth embodiment of the present invention is to describe how the first, second and third embodiments are configured and executed in the digital television receiver. Therefore, a detailed description of the fourth embodiment will be omitted for simplicity of the description. Reference can be made to the descriptions of the first, second and third embodiments of the present invention for a better understanding of the fourth embodiment.

A broadcast receiver 801 includes a tuner 802, a demodulator 803, a demultiplexer 804, an A/V decoder 805, a display 806, a PSI/PSIP database 807, a PSI/PSIP decoder 808, an application controller 811, a channel manager 809, a channel map 810, a flash memory 812, and a non-volatile memory 813. Herein, for example, the broadcast receiver 801 may be a digital television receiver (DTV) which can receive digital broadcast programs. The tuner 802 receives a digital television signal including a program and system information/program and system information protocol (PSI/PSIP) table. Herein, the PSIP table includes a rating region table (RRT). And, the operations of the tuner 802 may be controlled by the channel manager 809.

The tuner 802 can record the result that received the digital television signal in the channel manager 809. The demodulator 803 demodulates the tuned signal received from the tuner 802 to a vestigal side band/enhanced vestigal side band (VSB/EVSB) signal. The demultiplexer 804 demultiplexes the demodulated signal received from the demodulator 803 to audio data, video data, and PSI/PSIP table data. The demultiplexing of the audio/video data may be controlled by the channel manager 809. On the other hand, the demultiplexing of the PSI/PSIP table data may be controlled by the PSI/PSIP decoder 808. The demultiplexed PSI/PSIP table is transmitted to the PSI/PSIP decoder 808, and the demultiplexed audio/video data are transmitted to the A/V decoder 805. Thereafter, the A/V decoder 805 decodes the received data.

The PSI/PSIP decoder 808 parses a PSI/PSIP section and reads all remaining actual section data parts which the demultiplexer 804 did not filter during the section filtering, thereby recording the data in the PSI/PSIP database 807. More specifically, among the data recorded in the PSI/PSIP database 807, information such as the RRT is stored in the non-volatile memory (NVM) 813. Accordingly, the broadcast receiver 801 can always use the information associated with the RRT regardless of whether the power is ON or OFF. Furthermore, since the non-volatile memory (NVM) 813 is being used, the time required for reading the RRT can be reduced.

Meanwhile, depending upon the change in the field value of the "version_number" of RRT, the PSI/PSIP decoder 808 acknowledges the fact that the RRT has been updated and, then, deletes the old version RRT that is stored in the non-volatile memory (NVM) 813. Thereafter, the newly updated RRT is stored in the non-volatile memory (NVM) 813 in the place of the deleted RRT. As the PSI/PSIP decoder 808 parses the PSI/PSIP section, the RRT information that is included in the PSI/PSIP may also be parsed. Subsequently, the currently parsed RRT information and the pre-stored RRT information are transmitted to the application controller 811.

At this point, based upon the currently parsed RRT information and the pre-stored RRT information, the application controller 811 decides whether to block the broadcast program being transmitted from a channel, which is currently being received through the tuner 802. For example, if the application controller 811 decides that the broadcast program should be blocked, the application controller 811 controls the display 806 and does not output the video/audio data of the broadcast program that requires to be blocked. In this case, the application controller 811 may either display a black screen through the display 806 or display a warning message indicating that the current broadcast program is blocked and, therefore, cannot be displayed.

As described above, in the digital television signal for receiving program and system information protocol (PSIP) data, the method for processing the digital television signal, and the digital television receiver according to the present invention, the rating criteria of broadcast programs are diversified in order to provide a wider range of convenient options to the users. Furthermore, the present invention can set up rating criteria of broadcast programs regardless of the geographical rating regions of the television receiver. Therefore, the digital television receiver can be used normally (or without any problems) even when the country in which the television receiver is located is changed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing a digital broadcast signal in a digital broadcast receiver, the method comprising:

receiving a digital broadcast signal including a broadcast program and a rating region table (RRT), the rating region table (RRT) including both a rating region field identifying a specific geographical rating region to be associated with the rating region table (RRT) and at least one local rating information including a local rating value which is valid for the specific geographical rating region, wherein the rating region table (RRT) further includes a global rating field defining a global rating value which is valid for geographical rating regions, displaying a first information identifying whether a function on the rating of the broadcast program is to be set up;

displaying a second information identifying types of the rating;

displaying a third information identifying levels mapped with each of the types, and blocking display of the broadcast program based on the first information by comparing user's set up information with the rating of the broadcast program based on the first, second and third information and controlling to block display of the broadcast program depending on that the rating of the broadcast program corresponds to the user's set up information.

2. The method of claim 1, wherein the at least one local rating information further includes at least one independent dimensions which is valid for the specific geographical rating region.

3. The method of claim 1, wherein the blocking further includes blocking display of the broadcast program based on a comparison between the local rating information and a user's set blocking information.

4. A method of processing a digital broadcast signal in a digital broadcast receiver, the method comprising:

receiving a digital broadcast signal including a broadcast program and a rating region table (RRT), the rating region table (RRT) including both a version number field and a rating region field, wherein the rating region field identifies a specific geographical rating region to be associated with the RRT and the rating region field further identifies a dynamic RRT being independent of the specific geographical rating region;

displaying first option indicating whether the dynamic RRT is to be used or not;

displaying second option which displays at least one category of the dynamic RRT if the dynamic RRT is selected;

displaying third option identifying a blocking level for a specific category among the categories of the dynamic RRT if the specific category is selected, wherein the first option, the second option and the third option are displayed sequentially in a screen of the digital broadcast receiver; and controlling the digital broadcast receiver according to the first option, the second option and the third option.

5. The method of claim 4, wherein the controlling further comprises:

comparing a user's set rating with the broadcast programs rating; and displaying a black screen.

6. The method of claim 4, wherein the controlling further comprises:
  comparing a user's set rating with the broadcast program's rating; and
  displaying a warning message indicating that the broadcast program is blocked according to the result of comparing.

* * * * *